July 27, 1926.
L. GUERRINI
VEHICLE WHEEL
Filed Jan. 12, 1921
1,594,257
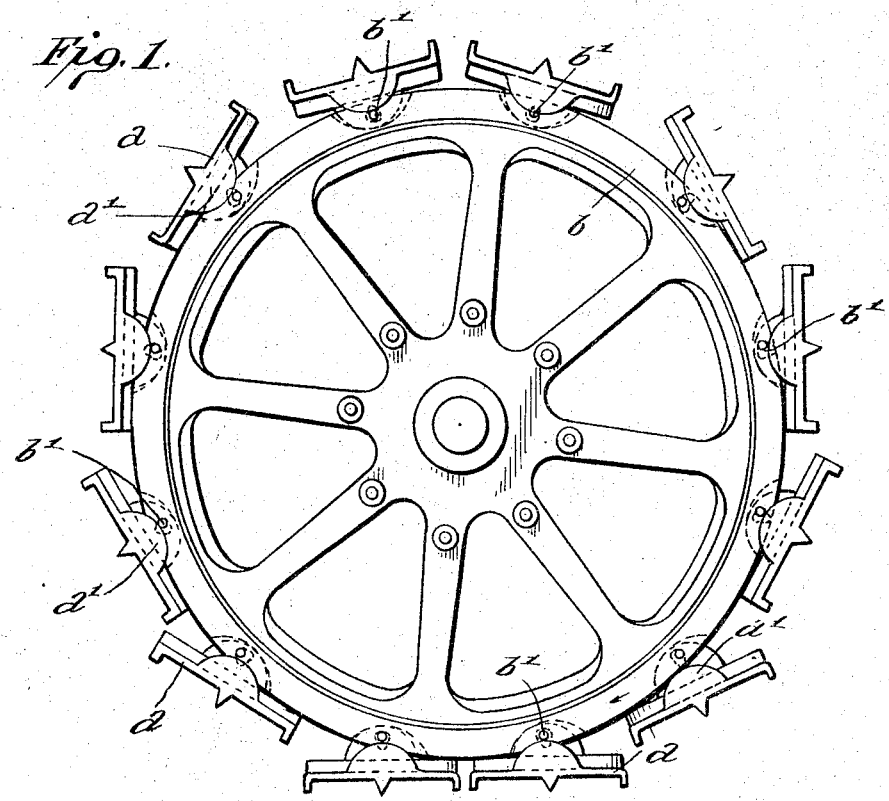
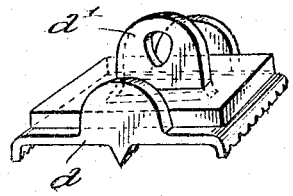
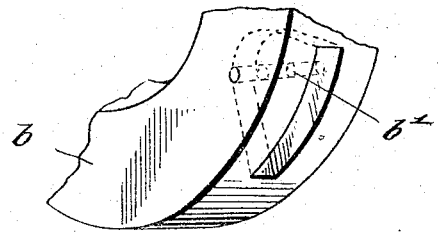
Luigi Guerrini, Inventor
By [signature]
Attorney Patented July 27, 1926.

1,594,257

UNITED STATES PATENT OFFICE.

LUIGI GUERRINI, OF MILAN, ITALY.

VEHICLE WHEEL.

Application filed January 12, 1921, Serial No. 436,752, and in Italy April 16, 1918.

The invention relates to wheels for vehicles, and it has for its principal object to provide the wheels with means for increasing traction of the vehicle upon the ground and reducing the pressure exerted on the ground per units of surface of the wheel.

The invention consists mainly in providing any driving wheel, whatever it may be, with an easily removable anti-skid device constituted by a portable rack-rail composed of a series of dismountable shoes independent and discontinuous, set up with a tangential and lateral play, these shoes being so mounted that the suspension parts serve not only for placing the shoes in front of the wheel and raising them rearwardly of the wheel, but at the same time for the cogging of the wheel with the shoes.

The invention further provides a simple and efficient construction and arrangement of parts and has in view other objects hereinafter more fully described, reference being had to the accompanying drawings in which:—

Fig. 1 is a view in elevation of a wheel provided with a series of shoes embodying the invention.

Fig. 2 is a perspective view of a single shoe.

Fig. 3 is a perspective view of a part of the rim of a wheel intended to be used with the shoe shown in Fig. 2.

According to the invention the wheel $b$ is provided with a series of shoes $a$, said shoes $a$ and the means for suspending them to the rim of the wheel being so constructed that the shoes may move radially and tangentially with respect to the said rim, in such a manner that the whole traction strain is supported by said suspension means and by these alone, and that the guiding of the shoes is effected, not directly by the rim of the wheel, but automatically by the action of the gravity.

For that purpose and as shown in Fig. 2, each shoe is provided with an intermediate ear $a^1$ which engages in a corresponding radial recess on the rim, the said recess being formed in such a way that, when the ear is maintained in it by the pin $b$, the ear can oscillate freely in said recess. With such a disposition it is not necessary that the pins $b$ project laterally with respect to the rim.

Instead of one intermediate ear, two or more ears could be used; furthermore, and as shown in Fig. 2, the shoes provided with intermediate ears could be also provided with lateral ears, but in that event such lateral ears can be made shorter, so that they are not provided with holes and act only for guiding the shoes.

The shoes have their surfaces which come into contact with the ground provided with ribs, holes or other suitable projections.

The play of the means which secure the shoes to the wheel is sufficient to cause the rim to bear directly on the shoe which bears on the ground and not upon the securing means itself.

The width between the outer ears $a^1$ (Fig. 2), is somewhat greater than the width of the rim $b$ of the wheel embraced between said ears, and similarly, the thickness of the median ear $a^1$ Fig. 2 is somewhat smaller than the width of the radial housing of the rim (Fig. 3) in which said median ear must work. It results thus that a lateral play is permitted between the rim and the shoes, sufficient to enable the wheel to be freely steered when the vehicle travels along a curve at a small angle upon each shoe on which the rim bears, without the latter being constrained to follow the rim in such a steering movement.

It is to be noted that during the rotation of the wheel, the shoes are suspended by means of the pins engaged in the mixtilinear triangular holes and that these pins move and slide against the edges of the holes, the height of which is such that whatever be the distance between the adjacent ends of two consecutive shoes, a given shoe engages the ground before the wheel reaches this shoe, while rolling upon it, and a moment after the wheel has left it, the shoes being so spaced and disposed that their action is entirely independent one from the others.

What I claim is:—

1. A traction wheel having a rim provided with a peripheral radially disposed recess, a shoe having a tractive portion and a pair of laterally spaced ears extending therefrom and embracing said rim, an intermediate ear on said shoe projecting into said recess and being provided with a hole having the form of an isosceles triangle with the apex directed toward said tractive portion of the shoe, and a pin extending transversely through said recess and through the hole in said intermediate ear for mounting the shoe upon the rim.

2. A traction wheel having a rim provided with a peripheral radially disposed recess, a shoe having a tractive portion, an ear on said shoe projecting into said recess and being provided with a hole having the form of a mixtilinear triangle, and a pin extending transversely through said recess and through the hole in said ear for mounting the shoe upon the rim, said ear being of less width than the width of said recess to allow play for turning said rim upon said shoe in steering.

3. A traction wheel having a rim provided with a peripheral radially disposed recess, a shoe having a tractive portion and a pair of laterally spaced ears extending therefrom and embracing said rim, an intermediate ear on said shoe projecting into said recess and being provided with a hole, and a pin extending transversely through said recess and through the hole in said intermediate ear for mounting the shoe upon the rim, the space between said lateral ears being greater than the width of the rim and the thickness of said intermediate ear being less than the width of said recess to allow play for turning said rim upon said shoe in steering.

In testimony whereof I have hereunto set my hand.

LUIGI GUERRINI.